W. S. CARR.
Water-Closet.
No. 168,613. Patented Oct. 11, 1875.
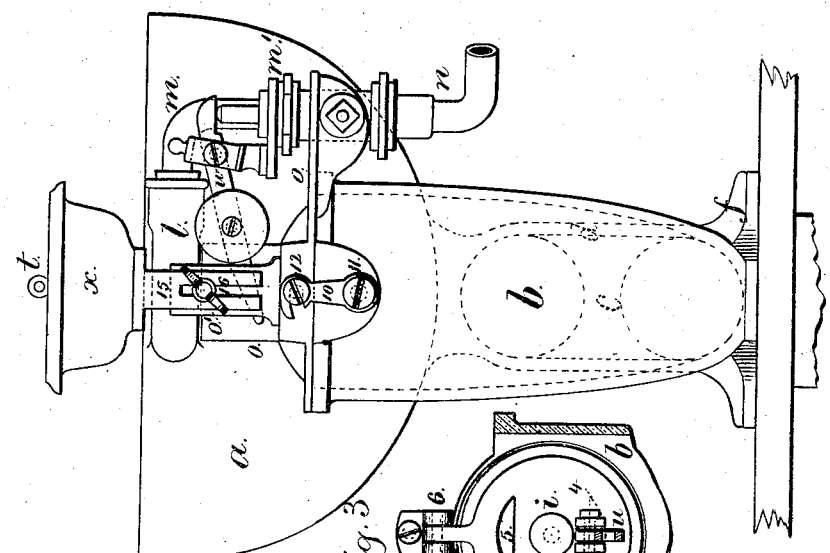
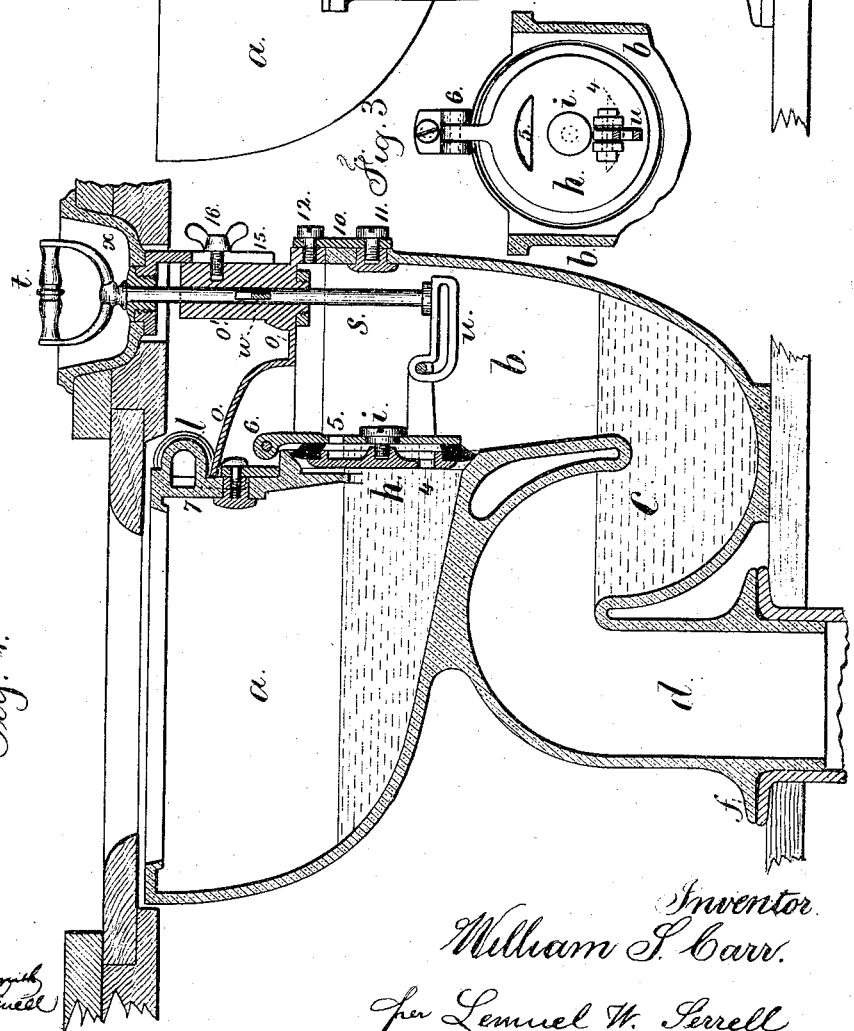
Witnesses
Chas. F. Smith
Harold Serrell
Inventor
William S. Carr
per Lemuel W. Serrell
Atty.
N. PETERS, PHOTO-LITHOGRAPHER, WASHINGTON, D.C.

UNITED STATES PATENT OFFICE.

WILLIAM S. CARR, OF NEW YORK, N. Y.

IMPROVEMENT IN WATER-CLOSETS.

Specification forming part of Letters Patent No. 168,613, dated October 11, 1875; application filed May 10, 1875.

*To all whom it may concern:*

Be it known that I, WILLIAM S. CARR, of the city and State of New York, have invented an Improvement in Water-Closets, of which the following is a specification:

I make the bowl and S-shaped escape-pipe of porcelain or earthenware, and in one piece, so that the trap and bowl are complete in themselves, and can be kept clean and free from smell resulting from any accumulation of offensive matter, and there is no risk of leakage. The exit from the bowl into the trap is closed by a peculiarly-constructed valve that forms an overflow-dam, and the supply-cock and pull of the closet are connected with a removable metal cover that closes the upper end of the S-pipe, and, when removed, gives access to the trap and to the valve.

In the drawing, Figure 1 is a vertical section of the closet complete. Fig. 2 is a partial elevation, showing the pull and valve or cock, and Fig. 3 is a back elevation of the valve.

The basin $a$, descending pipe $b$, trap $c$, and discharge-pipe $d$ are all made in one, and of porcelain or earthenware, by preference; but they might be of cast-iron, and enameled. The discharge-pipe $d$ is adapted to fit into the upper end of the sewer-pipe, as usual, and there is a base or flange, $f$, upon which the closet rests and is firmly supported. The opening between the pipe $b$ and basin $a$ is tapering, as shown, so as to form a seat for the india-rubber packing-ring of the valve $h$. This valve $h$ is made of two disks connected by the screw $i$, and the india-rubber packing-ring is between them, and hence it is held in place, and also makes the joint between the two disks water-tight. In the disk that is next to the basin there is an opening, 4, in the lower part, and in the back disk there is an opening, 5, that is higher up, so that the valve forms a dam that retains the required quantity of water, and the surplus flows off through this valve. It will be observed that the shape of the basin is such that there is a broad area of water retained therein; hence the basin is less liable to become soiled, and as soon as the valve is opened the rush of water will carry off all the contents of the pan. This valve $h$ is united to the basin by a hinge joint and bolt, 6, that passes through the basin, and the deflector 7 of the basin is preferably at this place, and on the outside there is the hub or hollow horn $l$, to which the supply-pipe $m$ is connected, preferably by the use of a hollow rubber plug, through which the pipe passes. The valve $m'$ is of usual construction, and to this the water is supplied by the pipe $n$. The cock or valve $m'$ is attached to the removable cover $o$, that is of a shape to fit over the upper end of this tube $b$, and beneath the projecting horn or hub $l$, and this cover is secured by the hook 10, attached by and moving upon the screw 11, and hooking over the screw 12, that serves to clamp the hook firmly when the parts are connected. The cover is rendered tight by putty introduced between the cover and the porcelain. This cover $o$ supports the cock or valve $m'$, and is provided with a column, $o'$, through which the stem $s$ slides. This stem is provided with a handle, $t$, at the upper end, and at the lower end there is a slotted arm, $u$, that passes between lugs at the back of the valve $h$, and a pin passes through these lugs and the slot. As the pull is drawn up the arm $u$ is raised, and the vertical portion unlocks the valve, and then said valve is lifted to discharge the contents of the bowl. When the arm, valve, and pull drop, the valve is held firmly against the action of the water by the vertical portion of the slot in the arm forming a lock. The lever $w$ is operated by the pull, and moves the stem of the supply-cock, and, in consequence of the pull moving before the valve is unlocked and opened, the water will be allowed to run into the pan before the valve is opened, and the contents of the pan discharged. The porcelain cup $x$ for the pull is held by the slotted bar 15 and screw 16, so that it can be raised or lowered, and secured at the level of the wood-work.

I claim as my invention—

1. The basin $a$, pipe $b$, trap $c$, and delivery-pipe $d$, all made in one piece, with a circular tapering valve-seat around the opening from the side of the basin $a$ into the pipe $b$, substantially as set forth.

2. The valve $h$, made double, and clamping the elastic ring, and provided with the openings 4 and 5, so as to form a dam for retaining the water in the basin and allowing an overflow, as set forth.

3. The removable cover $o$ to the pipe $b$, carrying the supply-cock $m'$, in combination with the pull and the lever that operates the cock, substantially as set forth.

4. The valve $h$, united to the basin by a hinge joint and bolt, 6, above the opening from the basin $a$ to the pipe $b$, in combination with the stem $s$, arm $u$, and slotted lugs at the back of the valve, as and for the purposes set forth.

Signed by me this 7th day of May, A. D. 1875.

WM. S. CARR.

Witnesses:
GEO. T. PINCKNEY,
CHAS. H. SMITH.